(12) United States Patent
Tsuji et al.

(10) Patent No.: US 8,363,328 B2
(45) Date of Patent: Jan. 29, 2013

(54) LIQUID LENS

(75) Inventors: Minoru Tsuji, Kawasaki (JP); Yoshihiro Saito, Hachioji (JP); Takashi Urakawa, Kawaski (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 12/948,372

(22) Filed: Nov. 17, 2010

(65) Prior Publication Data

US 2011/0149406 A1  Jun. 23, 2011

(30) Foreign Application Priority Data

Dec. 21, 2009 (JP) ................................. 2009-288828

(51) Int. Cl.
*G02B 1/06* (2006.01)
*G02B 3/12* (2006.01)

(52) U.S. Cl. .......................... 359/665; 359/666; 359/667

(58) Field of Classification Search ........... 359/665–667
See application file for complete search history.

(56) References Cited

U.S. PATENT DOCUMENTS
2004/0218283 A1* 11/2004 Nagaoka et al. .............. 359/665

FOREIGN PATENT DOCUMENTS
JP 01-302301 A 12/1989
JP 2000-249813 A 9/2000

* cited by examiner

*Primary Examiner* — Evelyn A. Lester
(74) *Attorney, Agent, or Firm* — Canon USA Inc IP Division

(57) ABSTRACT

A liquid lens including at least two phase liquids covered with a protection member having transparent portions allowing transmission of light includes an elastic film configured to separate the at least two phase liquids within the protection member, a connection portion configured to connect the protection member to the elastic film, and a movement unit configured to move the connection portion within the protection member.

8 Claims, 24 Drawing Sheets

FIG. 7A
FIG. 7B
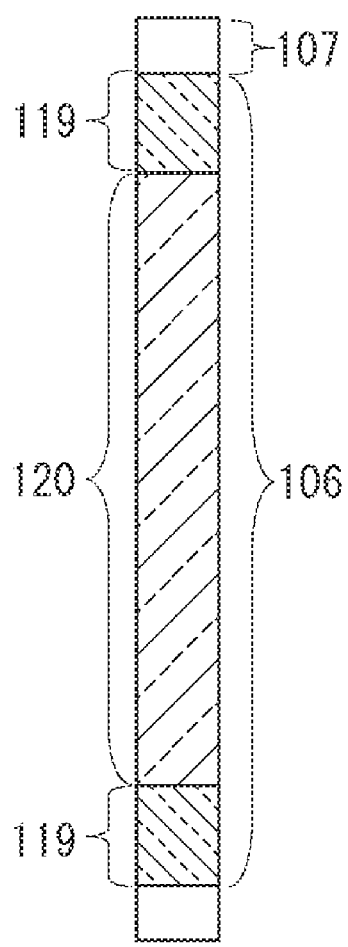
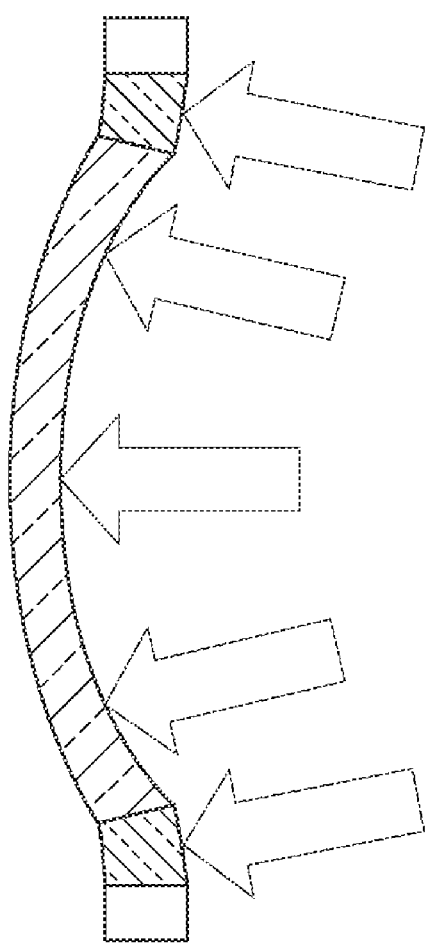

FIG. 11A
FIG. 11B
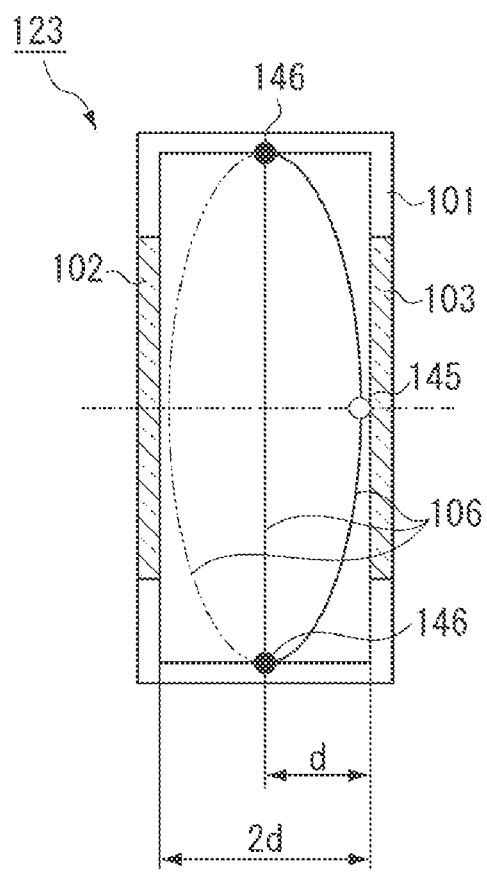
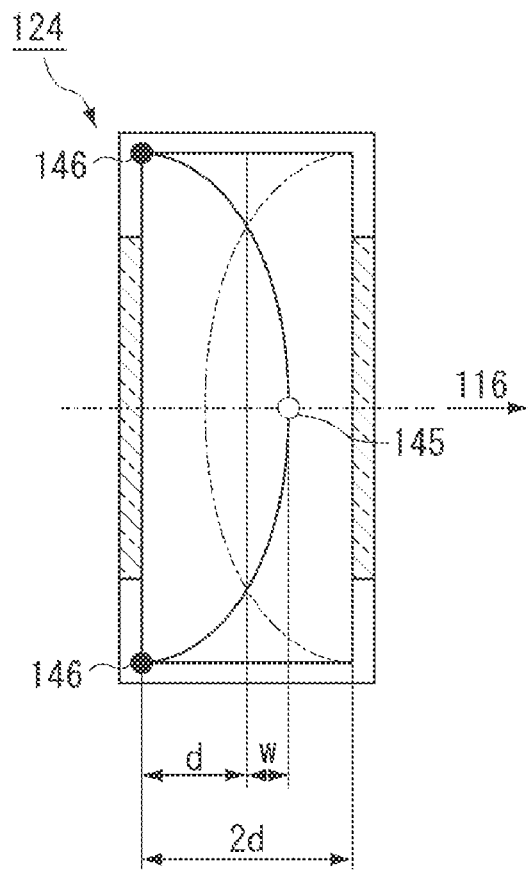

LIQUID LENS

BACKGROUND OF THE INVENTION

1. Field of the Invention

The present invention relates to a liquid lens containing liquids for changing focus.

2. Description of the Related Art

In recent years, remarkably high performance owing to the increased number of pixels and the like in a camera mounted to a portable terminal device or the like has been attained, and there has been a demand for a highly accurate optical zooming function along with the high performance of the camera. In ordinary optical zooming, it is necessary to change a focal length between an image sensor (e.g., a charge-coupled device (CCD) sensor) in a camera and a lens, and the focal length is changed by mechanically moving the lens. Therefore, in the case of mounting the ordinary optical zooming, a space for the movement of the lens is required. However, there are demands for downsizing and thinning of a camera in portable terminal devices, and an increase in size due to the space for movement of a lens should be avoided even in the case of mounting the optical zooming function.

As a method for attaining the space saving, Japanese Patent Application Laid-Open No. 01-302301 discusses a liquid lens that does not require the space for movement of the lens.

In Japanese Patent Application Laid-Open No. 01-302301, the lens includes two phase liquids which are partitioned by an elastic transparent film, and the shape of the elastic transparent film is changed by adjusting an amount of each of the two phase liquids by an externally connected pump, thereby adjusting a lens focus. In the liquid lens, since the lens focus is changed when the shape of the liquid lens itself is changed by the liquid amount adjustment, the space for movement of the lens is no longer necessary.

Also, as another mode of the liquid lens, Japanese Patent Application Laid-Open No. 2000-249813 discusses a lens including a single phase liquid which is covered with an elastic transparent film, of which a lens focus is changed by changing the shape of the elastic film by an actuator.

However, though the space for movement of the lens is not required in the liquid lens discussed in Japanese Patent Application Laid-Open No. 01-302301, the pump for adjusting the liquid amounts and a liquid reserve tank are required. Therefore, it is difficult to attain the space saving of an entire device to which the liquid lens is to be mounted. Also, though the pump and the tank are not required in the liquid lens discussed in Japanese Patent Application Laid-Open No. 2000-249813, it is in some cases impossible to ensure satisfactory accuracy of the focus adjustment because of deflection of the elastic film due to an external cause, such as gravity or external impact, since the elastic film is exposed to the outside.

SUMMARY OF THE INVENTION

The present invention is directed to realization of both of space saving and ensured focus adjustment accuracy of a device to which a liquid lens is mounted.

According to an aspect of the present invention, a liquid lens including at least two phase liquids covered with a protection member having transparent portions allowing transmission of light includes an elastic film configured to separate the at least two phase liquids within the protection member, a connection portion configured to connect the protection member to the elastic film, and a movement unit configured to move the connection portion within the protection member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B are diagrams illustrating an elastic member according to the first exemplary embodiment.

FIGS. 11A and 11B are diagrams illustrating an effect of the liquid lens according to the first exemplary embodiment.

DESCRIPTION OF THE EMBODIMENTS

Various exemplary embodiments, features, and aspects of the invention will be described in detail below with reference to the drawings.

Figure 1:
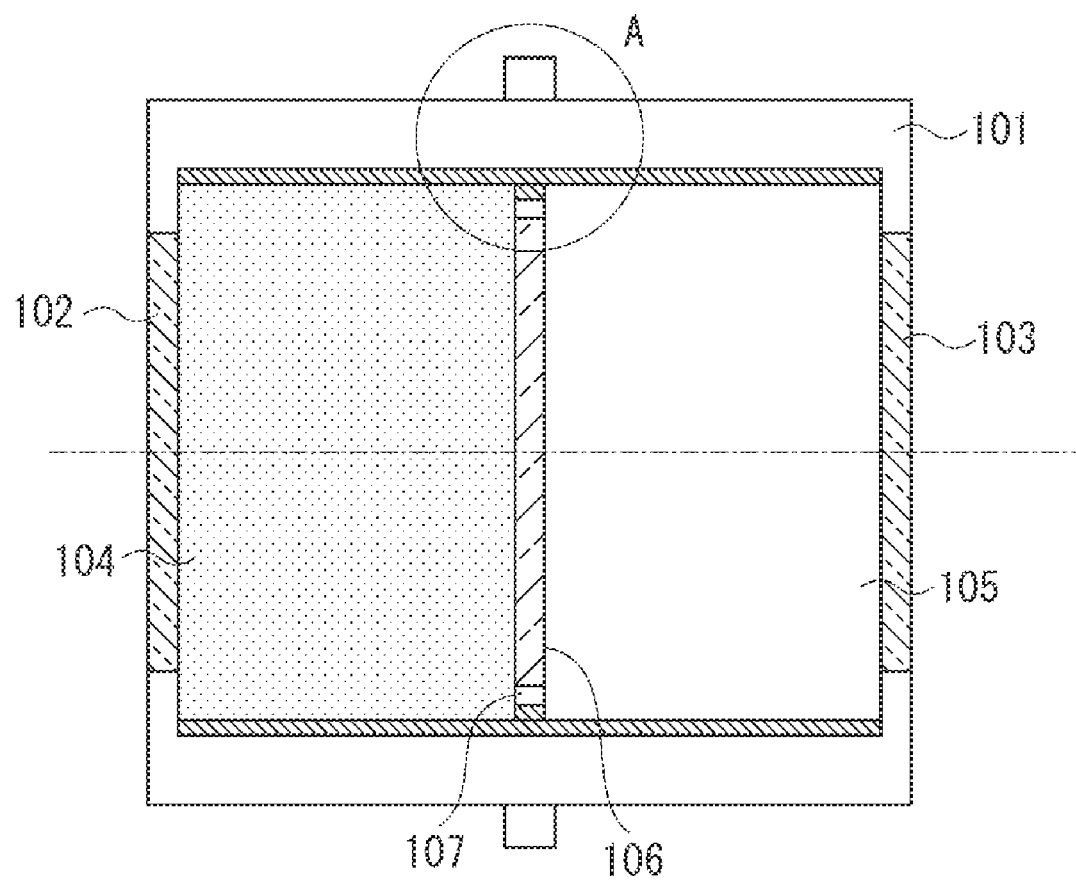
FIG. 1 is a sectional view illustrating a liquid lens according to a first exemplary embodiment of the present invention.

FIG. 1 is a sectional view illustrating a two-phase liquid lens using two liquids according to a first exemplary embodiment of the present invention. Each of transparent portions 102 and 103 forms a plane that is perpendicular to a direction in which light is made incident on the liquid lens and is formed of a member allowing the light to transmit therethrough. On each of opposite ends of the liquid lens, a connection portion 107 is slidably mounted along an inner wall of a cylindrical protection member 101 having the transparent portions 102 and 103. A transparent elastic member 106 is integrally mounted to the connection portions 107. The elastic member 106 is a shape-variable elastic film. Two spaces partitioned by the connection portions 107 are tightly charged with liquids 104 and 105, respectively.

Figure 2:
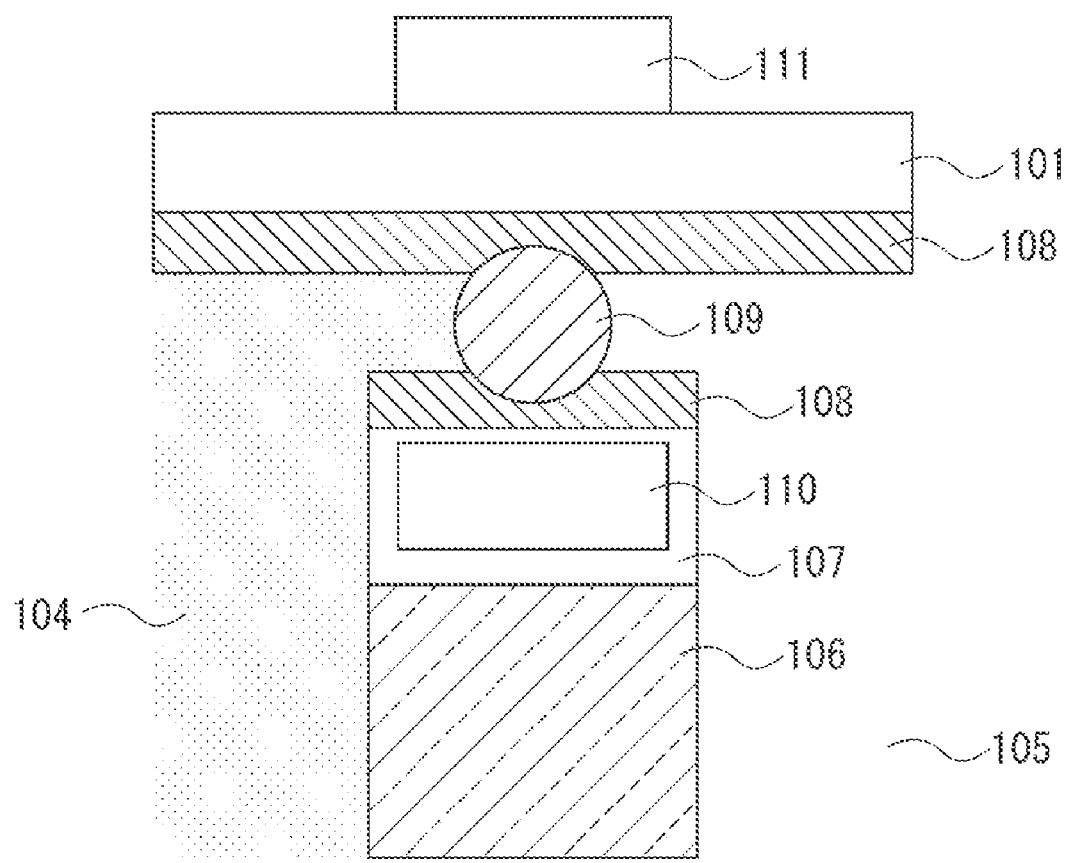
FIG. 2 is a detailed sectional view illustrating a part A of the liquid lens illustrated in FIG. 1.

FIG. 2 is a detailed sectional view illustrating a part A of the liquid lens illustrated in FIG. 1. Water repelling members 108 are provided at a sliding portion between the protection member 101 and the connection portion 107, and an O-ring 109 is provided on the connection portions 107 in such a manner as to fill a gap between the water repelling members 108. A magnetic portion 110 is integrally provided inside the connection portion 107. The position of the magnetic portion 110, i.e., the position of the connection portion 107, can be changed by moving a magnetic portion 111 provided outside the protection member 101 in a longitudinal direction of the protection member 101 along an outer periphery of the protection member 101.

Figure 3:
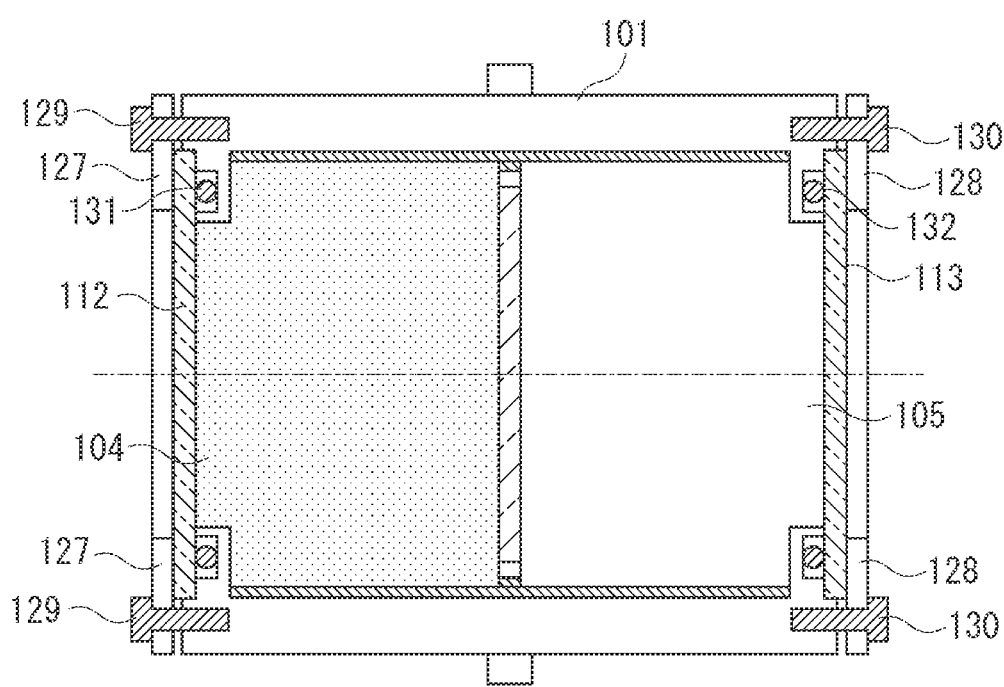
FIG. 3 is a sectional view illustrating a liquid lens in which a part of configuration of the liquid lens according to the first exemplary embodiment is modified.

FIG. 3 is a sectional view illustrating a liquid lens in which transparent portions 112 and 113 provided on the opposite ends of the protection member 101 are formed of a member that is different from that of the protection member 101. The transparent portions 112 and 113 are pressed by covering members 127 and 128 each having a hole. The covering members 127 and 128 are fixed to the protection member 101 by screws 129 and 130, respectively. To prevent the liquids 104 and 105 from leaking through a gap between the protection member 101 and the transparent portions 112 and 113, O-rings 131 and 132 are provided between the protection member 101 and the transparent portions 112 and 113.

Figure 4:
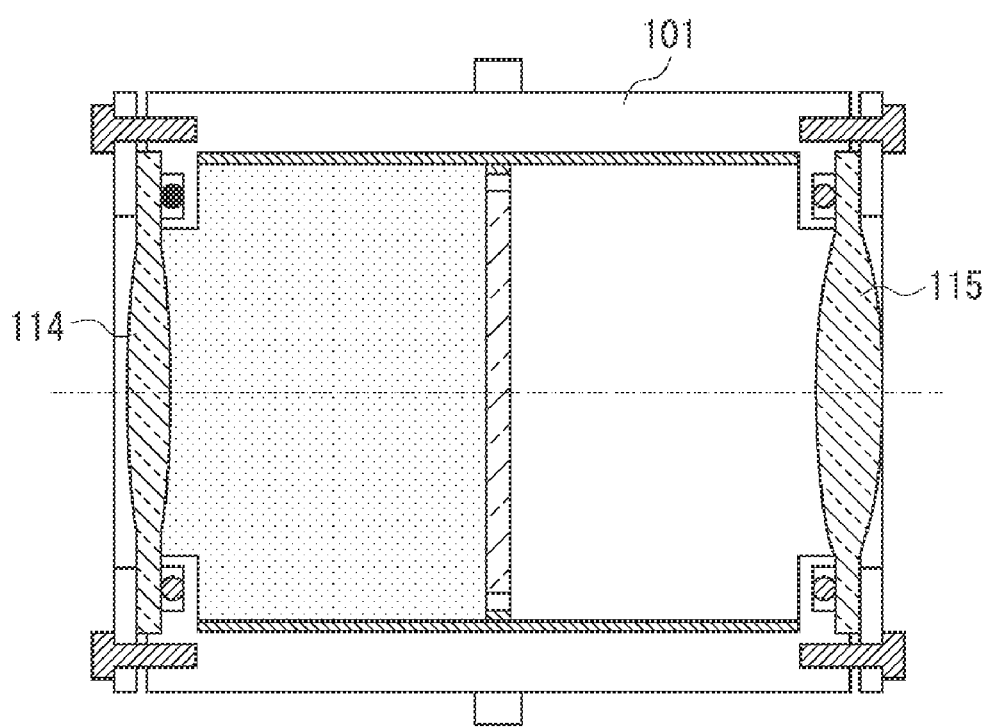
FIG. 4 is a sectional view illustrating a liquid lens in which a part of configuration of the liquid lens according to the first exemplary embodiment is modified.

FIG. 4 is a sectional view illustrating a liquid lens in which transparent portions 114 and 115 provided on the opposite ends of the protection member 101 are formed of an optical element. The type of the optical element to be used for the transparent portions 114 and 115 is not limited, and any one of a lens, a prism, and a liquid crystal element may be used. Also, the member for the transparent portions 102, 103, 112, 113, 114, and 115 and the transparent elastic member 106 is not limited to those having the property of allowing transmission of visible light, and a member having a property of allowing transmission of invisible light or light of a specific wavelength may be used.

Figure 5:
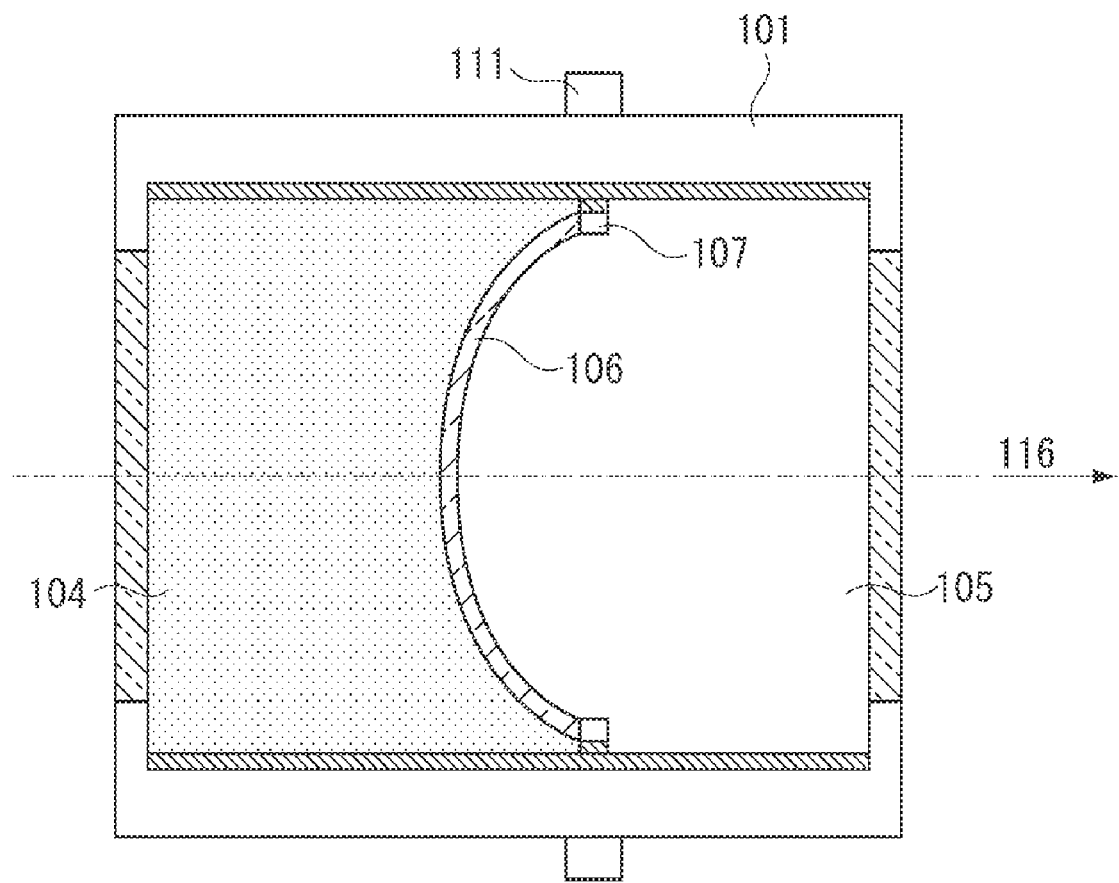
FIG. 5 is a diagram illustrating an operation of the liquid lens according to the first exemplary embodiment.

FIG. 5 is a sectional view illustrating a state of the liquid lens after the connection portion 107 is slid along the protection member 101 in a right longitudinal direction 116 of the protection member 101. When the magnetic portion 111 is moved in the right longitudinal direction 116 of the protection member 101, the connection portion 107 slides along the inner wall of the protection member 101, so that the elastic member 106 integrally mounted to the connection portion 107 moves along with the connection portion 107. Since the elastic member 106 receives a pressure from the liquid 105 when the elastic member 106 moves, both surfaces of the elastic member 106 form a curved surface shape as illustrated in FIG. 5.

Figure 6:
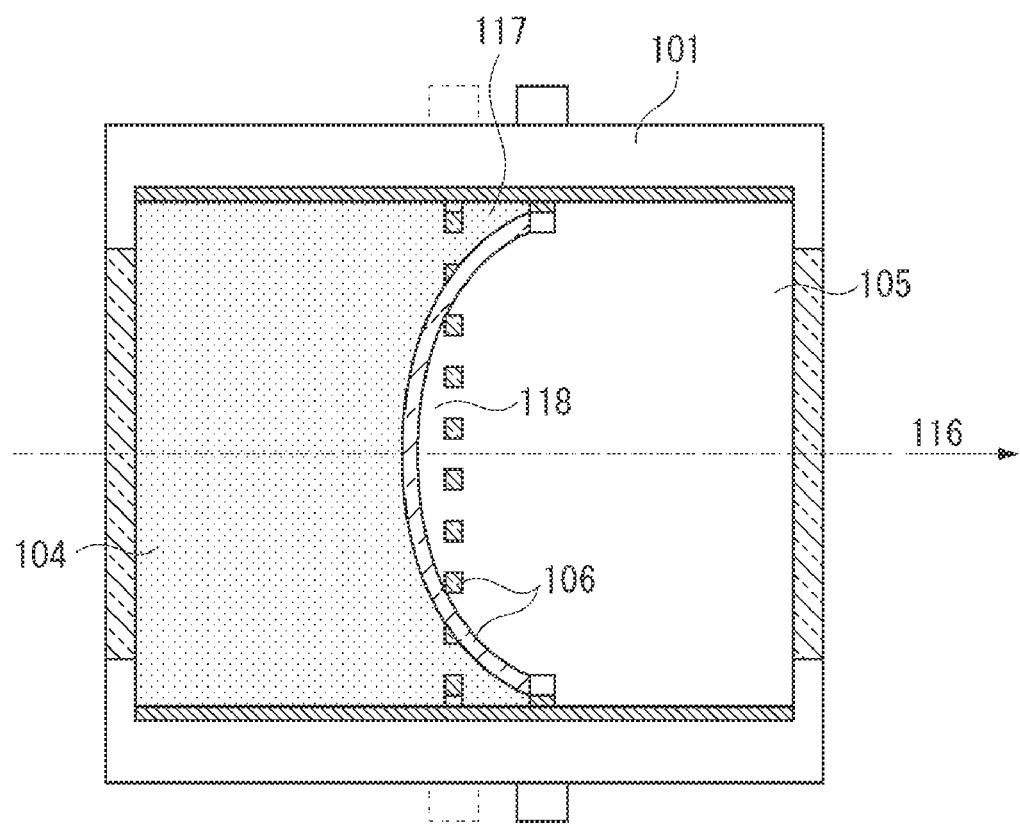
FIG. 6 is a diagram illustrating an operation of the liquid lens according to the first exemplary embodiment.

FIG. 6 is a sectional view of the liquid lens illustrating a change in surface shape of the elastic member 106 when the elastic member 106 is moved. In the case of using an incompressible liquid, since volumes of the liquids 104 and 105 are constant before and after the movement of the elastic member 106, the surface shape of the elastic member 106 changes in such a manner that the volumes of the liquids 104 and 105 are constant. Under an assumption that a thickness of the elastic member 106 is ignorable for easy understanding, the volume of a three-dimensional space defined by rotating a surface 117 about a central axis of the protection member 101 and a volume of a three-dimensional space defined by rotating a surface 118 about the central axis of the protection member 101 are identical to each other. As described above, since the surface shape of the elastic member 106 is uniquely determined by the distance of movement of the elastic member 106, the elastic member 106 can be controlled to form a desired surface shape by controlling the position of the elastic member 106.

FIG. 7A is a sectional view illustrating the elastic member 106 and the connection portion 107 in which an elastic modulus of the elastic member 106 is varied depending on a portion, particularly when an elastic modulus of an edge portion 119 is higher than an elastic modulus of a central portion 120. FIG. 7B is a sectional view illustrating the elastic member 106 and the connection portion 107 in which the surface shape of the elastic member 106 is changed as a result of receiving a pressure of the liquid 105 when the elastic member 106 illustrated in FIG. 7A moves to the right longitudinal direction 116 of the protection member 101 as illustrated in FIG. 6. Strength near the edge portion 119 can be improved by increasing the elastic modulus near the edge portion 119, thereby making it possible to increase durability of the elastic member 106 owing to a reduction in bending deformation at a connecting part between the elastic member 106 and the connection portion 107 at which a stress tends to be concentrated as illustrated in FIG. 7B.

Figure 8:
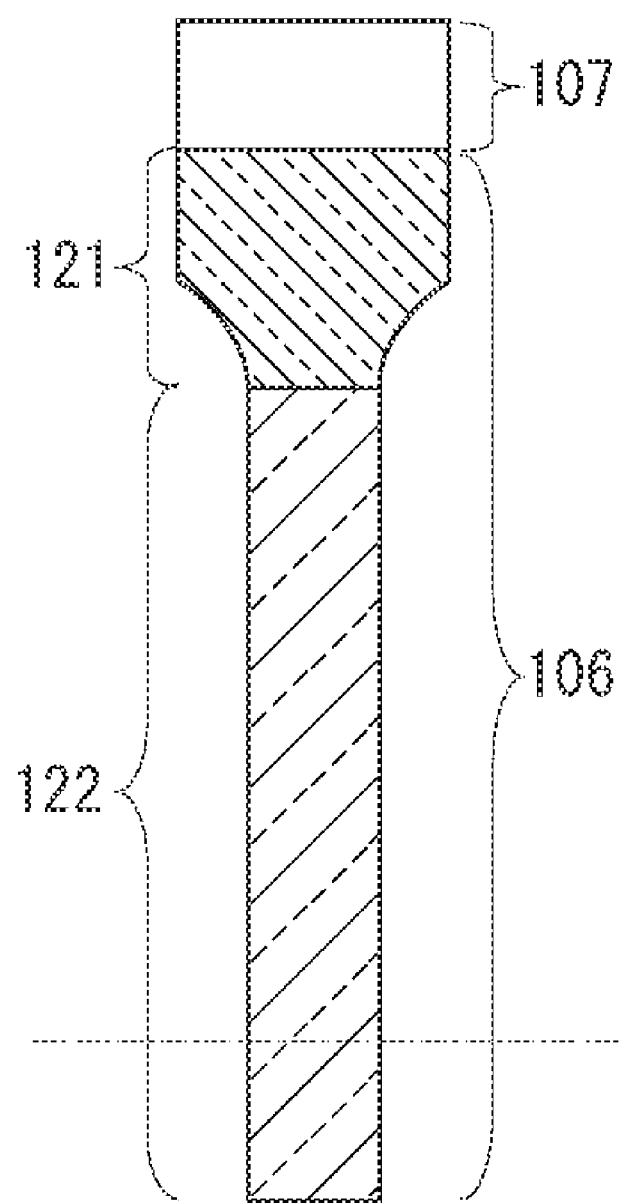
FIG. 8 is a sectional view illustrating the elastic member, in which an edge portion of the elastic member of the liquid lens according to the first exemplary embodiment is thicker than a central portion.

FIG. 8 is a sectional view illustrating the elastic member 106 in which an edge portion 121 of the elastic member 106 is thicker than a central portion 122. Owing to the increase in thickness of the edge portion 121, it is possible to attain the effect similar to the case of increasing the elastic modulus of the edge portion 119 as illustrated in FIG. 7A. Also, as a result of providing the thickness distribution over the elastic member 106, it is possible to change a pattern of changes of the surface shape of the elastic member 106 caused by the movement of the elastic member 106.

The elastic member used in the present exemplary embodiment is a member having light transmissivity, and the light transmissivity means characteristics that do not exert optical influences, such as optically satisfactory thinness, uniform elasticity, and refractive index isotropy. Specific examples of the elastic member to be used in the present exemplary embodiment include polyethylene terephthalate (PET), tri-acetylcellulose (TAC), and the like. Also, an elastic member having low light transmissivity, such as an elastic member also having characteristics of a neutral density (ND) filter, may be used.

The liquid used in the present exemplary embodiment is not limited to a liquid having high light transmissivity or a colorless and transparent liquid, and a liquid that allows transmission of light of a narrow range of wavelengths or light of a specific wavelength may be used according to desired optical characteristics. It is possible to reduce flexure that is caused by gravities of the liquids in the elastic member by using liquids having substantially the same density. Further, it is possible to reduce flexure of the elastic member by a gravity of the elastic member in addition to the flexure of the elastic member by the gravities of the liquids by using an elastic member having a density that is substantially the same with that of the liquids partitioned by the elastic member. Also, since the liquids are partitioned by the elastic member, it is possible to adapt liquids that are easily mixed with each other to the present exemplary embodiment. In order to prevent a reduction of a variable curvature range, it is desirable to use an incompressible liquid. Examples of the liquids to be used in the present exemplary embodiment include pure water, silicone oil, and the like.

Figure 9A:
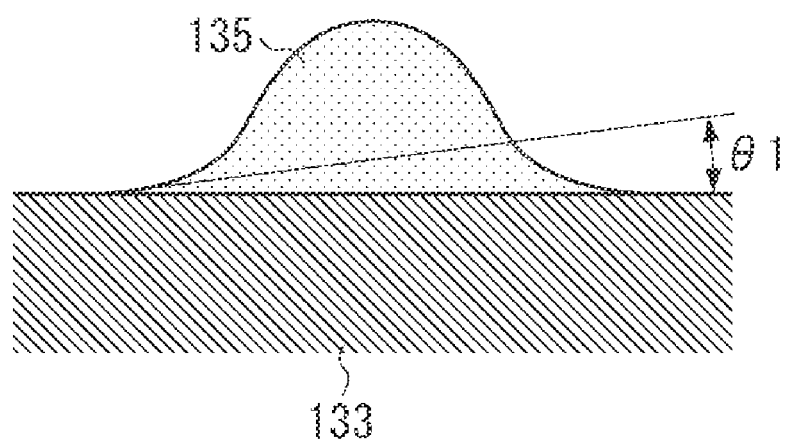
FIGS. 9A and 9B are diagrams illustrating water repellency.
Figure 9B:
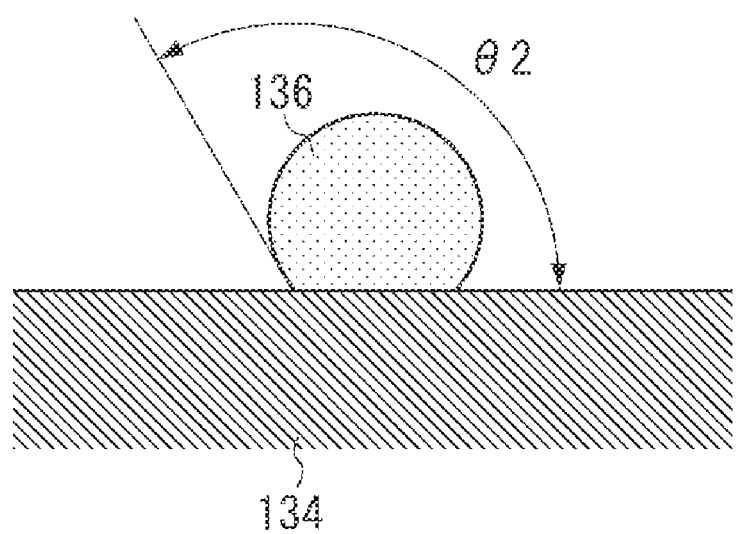

FIGS. 9A and 9B are sectional views illustrating surface shapes of water droplets 135 and 136 on a member 133 having low water repellency and on a member 134 having high water repellency. As illustrated in FIG. 9A, a contact angle θ1 of the water droplet 135 on the member 133 having low water repellency is an acute angle, so that the surface shape becomes the shape illustrated in FIG. 9A due to a surface tension of the water droplet 135. As illustrated in FIG. 9B, a contact angle θ2 of the water droplet 136 on the member 134 having high water repellency is an obtuse angle, so that the surface shape becomes the shape illustrated in FIG. 9B due to a surface tension of the water droplet 136.

Figure 10A:
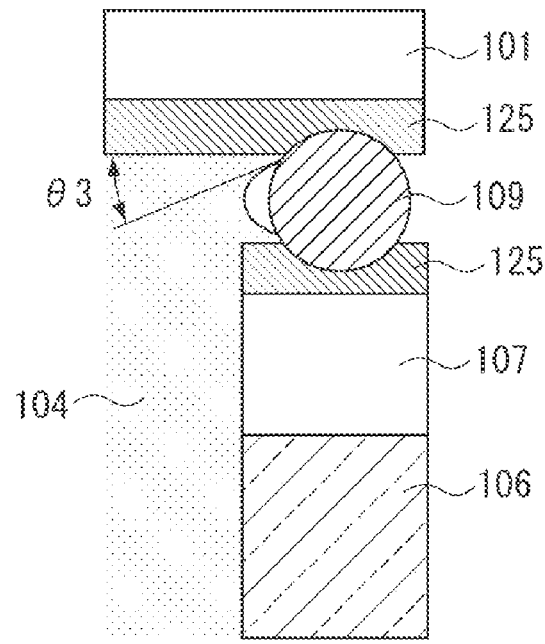
FIGS. 10A and 10B are diagrams illustrating an effect of the water repellency.
Figure 10B:
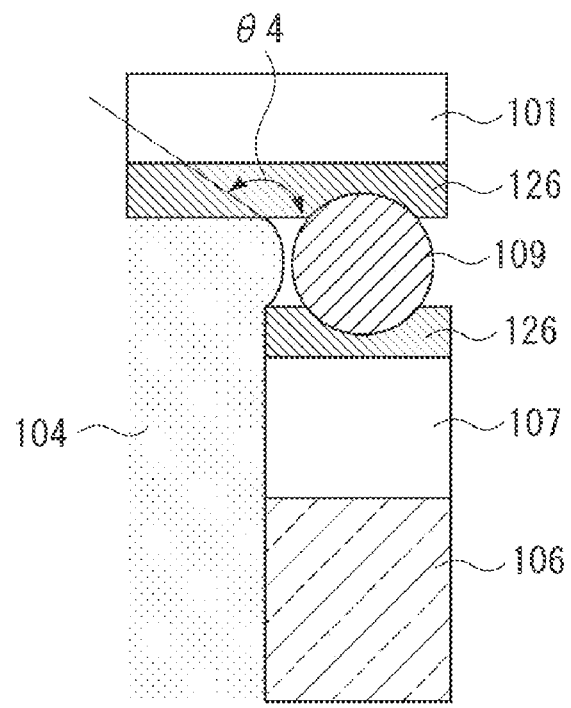

FIGS. 10A and 10B are partially detailed sectional views of the liquid lens illustrating an effect of the water repelling members provided at the sliding portions of the protection member 101 and the connection portion 107. In the present exemplary embodiment, the water repellency is considered as unwettability by liquids in general, not only as unwettability by water.

For example, oil repellency which is unwettability by oil is included in the water repellency. FIG. 10A is a diagram illustrating a surface of the liquid 104 on members 125 having low water repellency. Since a contact angle θ3 of the liquid 104 becomes an acute angle on the water repelling portions 125 on the protection member 101 and the connection portion 107 when the sliding portions have the low water repellency, the surface of the liquid 104 forms the shape illustrated in FIG. 10A, and the liquid 104 tends to flow into the gap between the sliding portions. FIG. 10B is a diagram illustrating a surface of the liquid 104 on members 126 having high water repellency. Since a contact angle θ4 of the liquid 104 becomes an obtuse angle on the water repelling portions 126 on the protection member 101 and the connection portion 107 when the sliding portions have the high water repellency, the surface of the liquid 104 forms the shape illustrated in FIG. 10B, and it is difficult for the liquid 104 to flow into the gap between the sliding portions. As described above, with the members 126 having high water repellency, it is possible to prevent each of the liquids 104 and 105 from flowing into the other liquid through the gap between the sliding portions and from deteriorating the optical performance. Examples of a method for providing the water repelling member to the sliding portions include a method for imparting water repellency to the sliding portions by coating or the like, a method for attaching a member having water repellency to the sliding portions as another member, a method for using a protection member or elastic member having water repellency, and the like. In the case of using pure water and silicone oil for the liquids 104 and 105, examples of the water repelling member to be used in the present exemplary embodiment include polyethylenetetrafluoroethylene (PTFE), which is coated on the sliding portions and the like.

As described above, it is possible to attain the downsizing with the use of the liquid lens having the constant liquid amounts as in the present exemplary embodiment since it is unnecessary to provide a liquid for adjusting the liquid amounts or a mechanism for adjusting the liquid amounts for the liquid lens in which the surface shape of the elastic member is variably controlled by adjusting the liquid amounts.

FIGS. 11A and 11B are sectional views of liquid lenses illustrating a difference in variable curvature range between a liquid lens 123 in which the elastic member 106 does not slide and a liquid lens 124 in which the elastic member 106 slides as in the present exemplary embodiment. As illustrated in FIGS. 11A and 11B, when lens widths 2d in the longitudinal direction of the protection members 101 are the same, a maximum distance in the longitudinal direction 116 of the protection member 101 between a surface apex 145 and an edge portion 146 of the elastic member 106 is "d" or less in the liquid lens 123. However, the maximum distance is "d+w" or less in the liquid lens 124. Therefore, when the lens widths are identical with each other, it is possible to widen a variable range of the surface shape of the liquid lens in which the elastic member slides as compared to the liquid lens in which the elastic member does not slide. Also, when the variable curvature ranges are identical with each other, it is possible to reduce the lens width of the liquid lends in which the elastic member slides as compared to the liquid lens in which the elastic member does not slide.

Figure 12:
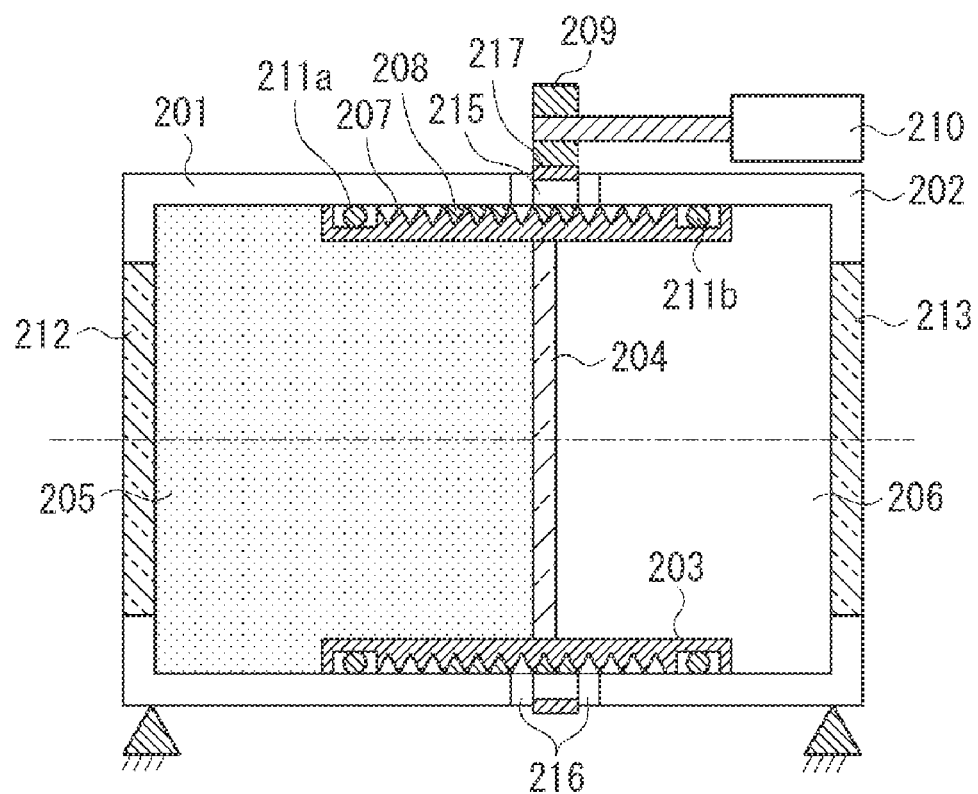
FIG. 12 is a sectional view illustrating a liquid lens according to a second exemplary embodiment of the present invention.

FIG. 12 is a sectional view illustrating a liquid lens using two liquids according to a second exemplary embodiment of the present invention. A connection portion 203 is fitted in cylindrical protection members 201 and 202 having an open surface at one end and transparent portions 212 and 213 at the other end. The fitting between the protection member 201 and the connection portion 203 is thread-fitting, and the fitting between the protection member 202 and the connection portion 203 is insertion-fitting. A transparent elastic member 204 is integrally attached to the connection portions 203. Spaces partitioned by the connection portion 203 to which the transparent elastic member 204 is integrally attached are air-tightly charged with liquids 205 and 206. A thread portion 207 of the connection portion 203 is fitted to a thread member 215 in addition to a thread portion 208 of the protection member 201.

The thread member 215 is provided with gear teeth 217 on its outer periphery, and the gear teeth 217 are engaged with a gear 209 attached to a motor 210. The motor 210 rotates the gear 209 to rotate the thread member 215, so that the connection portion 203 slides on the protection members 201 and 202. Here, a suppression member 216 for suppressing movement of the thread member 215 is provided between the protection member 201 and the protection member 202 and the thread member 215 to prevent the thread portion 215 from moving in a direction of sliding of the connection portion 203. When the connection portion 203 is caused to slide, the protection members 201 and 202 are fixed to the connection portion 203. In order to prevent the liquids 205 and 206 from leaking from a gap between the protection members 201 and 202 and the connection portion 203, O-rings 211a and 211b are provided on the connection member 203 in the present exemplary embodiment. An O-ring may be provided on the protection member 201 or 202.

Description of the transparent portions 212 and 213 is similar to that of the transparent portions in the first exemplary embodiment.

Figure 13:
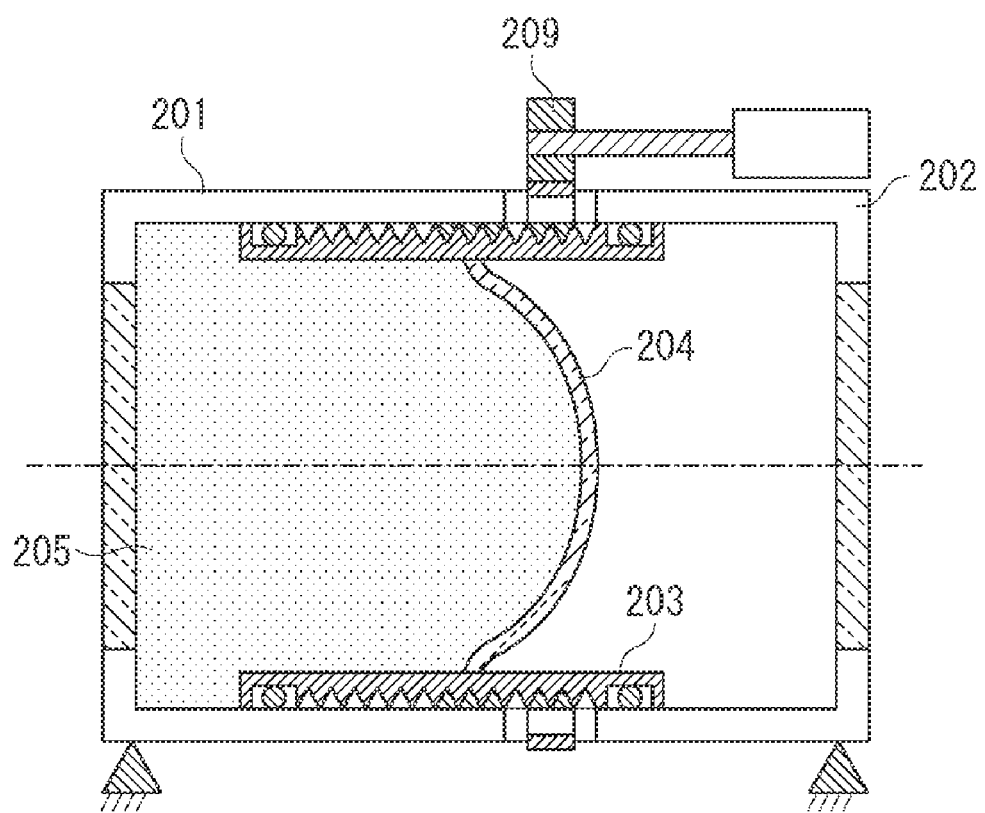
FIG. 13 is a diagram illustrating an operation of the liquid lens according to the second exemplary embodiment.

FIG. 13 is a sectional view illustrating the liquid lens after the connection portion 203 is caused to slide leftward on the protection members 201 and 202. The connection portion 203 slides leftward when the gear 209 is rotated, and the elastic member 204 integrally attached to the connection portion 203 moves along with the connection portion 203. When the elastic member 204 moves, the elastic member 204 receives a pressure from the liquid 205, so that the surface shape of the elastic member 204 changes as illustrated in FIG. 13. It is possible to control the elastic member 204 to form a desired surface shape by controlling a position of the elastic member 204 as described in the first exemplary embodiment.

Descriptions relating to an effect of a case where an elastic modulus of the elastic member 204 varies depending on a portion and characteristics of the elastic member 204 are similar to the descriptions in the first exemplary embodiment.

Description of the liquid to be used in the present exemplary embodiment is similar to the description in the first exemplary embodiment.

Figure 14:
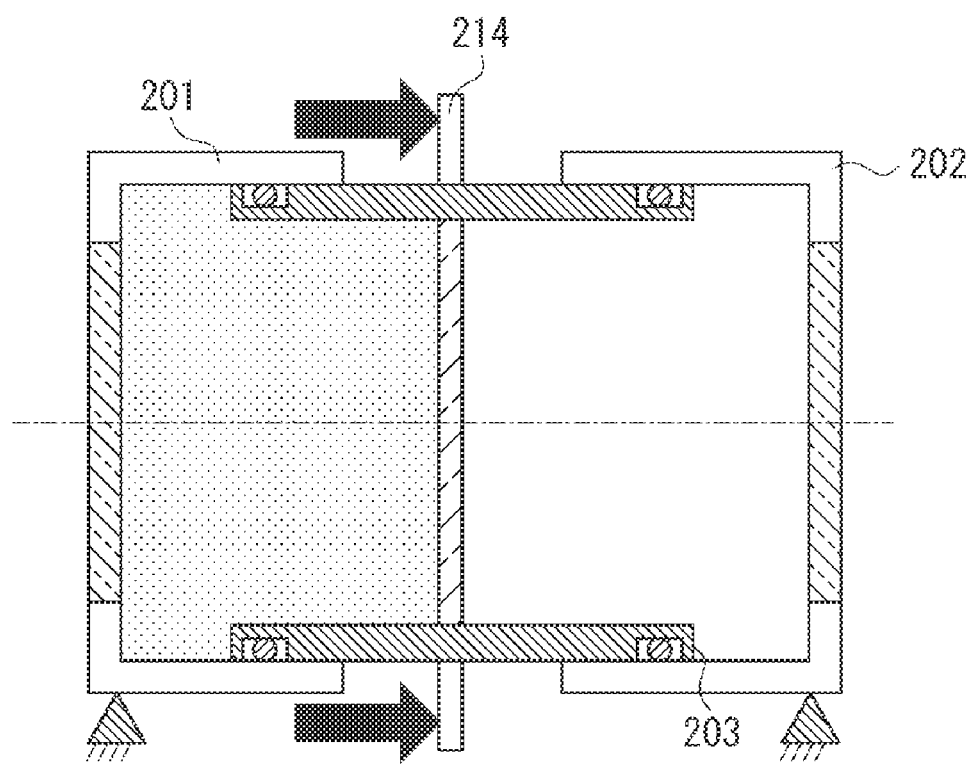
FIG. 14 is a sectional view illustrating another mode of the liquid lens according to the second exemplary embodiment.

FIG. 14 is a sectional view illustrating a liquid lens in which the connection portion 203 is inserted and fitted in the protection members 201 and 202. The connection portion 203 moves along the protection members 201 and 202 when a flange portion 214 formed on the connection portion 203 is pressed. The protection member 201 and the connection portion 203 or the protection member 202 and the connection portion 203 are fixed to each other at an arbitrary position by a fixing unit, such as a fastening screw (not illustrated). As illustrated in FIG. 14, it is possible to adapt the relatively simple configuration of not providing the thread portion to the protection member 201 and the connection portion 203 or to provide another mechanism for sliding the connection portion 203.

The liquid lens of the present exemplary embodiment includes the liquid 205, the sealing member 211a, air, the sealing member 211b, and the liquid 206, unlike a liquid lens in which two liquids are located opposite each other only via a sealing provided on the sliding member for separating the liquids. In other words, the sealing members do not simultaneously contact both of the liquids. Therefore, it is possible to select the optimum sealing member for each of the liquids, thereby increasing the sealing force. Consequently, it is possible to prevent deterioration of optical characteristics otherwise caused when each of the liquids enters the other liquid.

Also, the liquid lens of the present exemplary embodiment is capable of directly controlling the sliding of the elastic member from the outside. Therefore, much more ensured control of a lens focal length is enabled.

Though the example of the liquid lens in which the two spaces partitioned by the two protection members and the single elastic member are air-tightly charged with the liquids is described in the present exemplary embodiment, a configuration in which a liquid lens in which three or more spaces partitioned by three or more protection members and a plurality of elastic members are air-tightly charged with the liquids may be adopted. In this case, opposite ends of the protection member 202 are opened, and connection portions holding the elastic members are engaged with the open surfaces at the opposite ends as illustrated in FIG. 12. In the case of including a plurality of elastic members, it is possible to control the surface shapes by independently controlling sliding of each of the elastic members.

Figure 15:
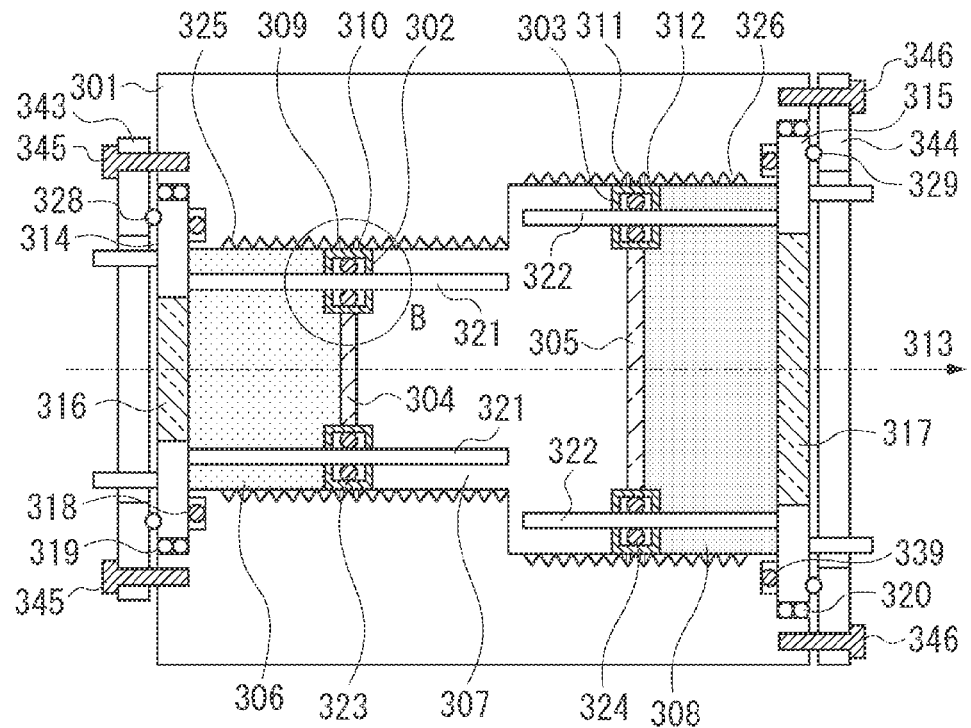
FIG. 15 is a sectional view illustrating a liquid lens according to a third exemplary embodiment of the present invention.

FIG. 15 is a sectional view illustrating a liquid lens using three liquids according to a third exemplary embodiment of the present invention. A connection portion 302 and a connection portion 303 are thread-fitted in a cylindrical protection member 301 having open surfaces at opposite ends thereof. Transparent elastic members 304 and 305 are integrally attached to the connection portions 302 and 303, respectively. Ring-like members 314 and 315 having transparent portions 316 and 317 at the centers, respectively, are rotatably attached to the respective opposite ends of the protection member 301. Description of the transparent portions is similar to the description in the first exemplary embodiment. Spaces partitioned by the connection portions 302 and 303, to which the transparent elastic members 304 and 305 are integrally attached, and the ring-like members 314 and 315 are tightly charged with liquids 306, 307, and 308. A sealing member 310 is provided on a thread portion 309 of the connection portion 302 to prevent the liquids 306 and 307 from leaking from a gap between the protection member 301 and the connection portion 302. Likewise, a sealing member 312 is provided on a thread portion 311 of the connection portion 303. Description of the sealing members 310 and 312 will be given below.

The protection member 301 is formed in a stepped shape in which the inner diameter changes at the middle longitudinal portion thereof. Accordingly, the sealing members 310 and 312 differ in diameter.

O-rings 318 and 339 are provided between the protection member 301 and the ring-like members 314 and 315 to prevent the liquids 306 and 308 from leaking from a gap between the protection member 301 and the ring-like members 314 and 315, respectively. Also, bearings 319 and 320 are provided between the protection member 301 and the ring-like members 314 and 315 to achieve smooth rotation of the ring-like members 314 and 315, respectively. The ring-like member 314 is pressed by a covering member 343 having a hole via a thrust bearing 328. Likewise, the ring-like member 315 is pressed by a covering member 344 having a hole via a thrust bearing 329. The covering members 343 and 344 are fixed to the protection member 301 by screws 345 and 346, respectively.

Shafts 321 and 322 extending to an internal part of the protection member 301 are integrally provided on the ring-like members 314 and 315, respectively, and the connection portions 302 and 303 are fitted on the shafts 321 and 322, respectively. The connection portions 302 and 303 are slidable along the shafts 321 and 322, respectively, in the axial direction and positioned in a radial direction by the fitting. An O-ring 323 is provided between the shaft 321 and the connection portion 302 to prevent each of the liquids 306 and 307 from entering the other liquid through a gap between the shaft 321 and the connection portion 302. Likewise, an O-ring 324 is provided between the shaft 322 and the connection portion 303.

Figure 16:
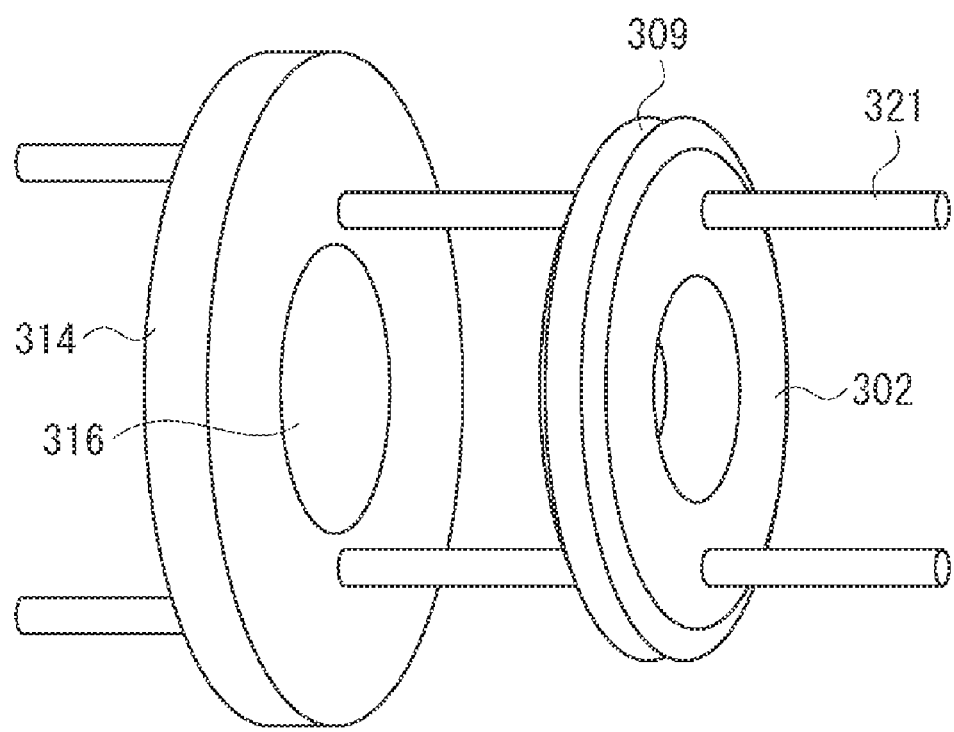
FIG. 16 is a diagram illustrating attachment of a connection portion according to the third exemplary embodiment.

FIG. 16 is a perspective view illustrating a state in which the shaft 321 provided on the ring-like member 314 is fitted in the connection portion 302. Referring to FIG. 16, the shaft 321 rotates integrally with the ring-like member 314 when the ring-like member 314 is rotated, and the connection portion 302 fitted on the shaft 321 rotates along with the shaft 321. Since the connection portion 302 is thread-fitted in the protection member 301, the connection portion 302 slides in the longitudinal direction along an inner wall of the protection member 301 when the connection portion 302 is rotated. In other words, it is possible to cause the connection portion 302 to slide leftward and rightward by positive and negative rotations of the ring-like member 314. Likewise, it is possible to cause the connection portion 303 to slide in left and right longitudinal directions by positive and negative rotations of the ring-like member 315.

Figure 17:
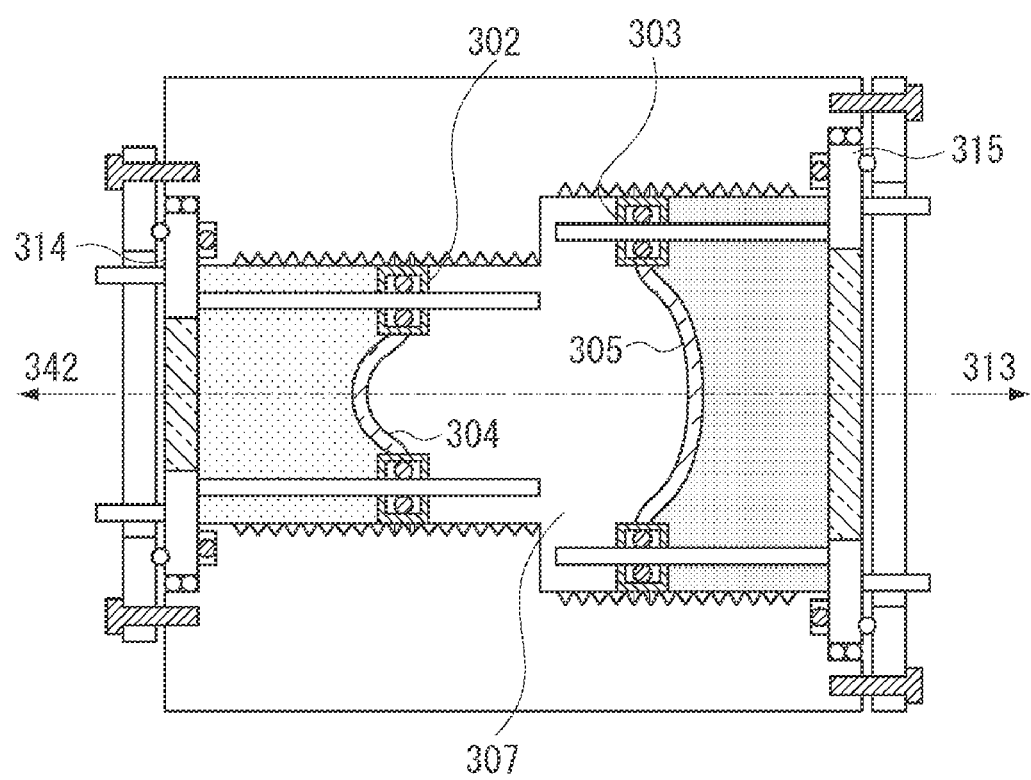
FIG. 17 is a diagram illustrating an operation of the liquid lens according to the third exemplary embodiment.

FIG. 17 is a sectional view illustrating the liquid lens in a state where the connection portions 302 and 303 are caused to slide along the protection member 301, wherein the connection portion 302 is caused to slide rightward in FIG. 17, and the connection portion 303 is caused to slide leftward in FIG. 17. When the ring-like member 314 is rotated to cause the connection portion 302 to slide along the inner wall of the protection member 301, the elastic member 304 moves in the right longitudinal direction 313 of the protection member 301 along with the connection portion 302. Likewise, when the ring-like member 315 is rotated to cause the connection portion 303 to slide along the inner wall of the protection member 301, the elastic member 305 moves in the left longitudinal direction 342 of the protection member 301 along with the connection portion 303. As described in the first exemplary embodiment, the elastic member 304 receives a pressure from the liquid 307 by the movement, so that a surface shape of the elastic member 304 changes to that illustrated in FIG. 17. Likewise, the elastic member 305 receives a pressure from the liquid 307 by the movement, so that a surface shape of the elastic member 305 changes to that illustrated in FIG. 17. In the present exemplary embodiment, it is possible to control the elastic members 304 and 305 to take desired surface shapes by controlling the amounts of rotation of the ring-like members 314 and 315. Also, it is possible to independently control the surface shapes of the elastic members 304 and 305 by the rotation of the ring-like member 314 and the rotation of the ring-like member 315. Descriptions relating to an effect of a case where an elastic modulus of the elastic member varies depending on a portion and characteristics of the elastic member are similar to the descriptions in the first exemplary embodiment. Also, the elastic members 304 and 305 do not necessarily have the same geometric characteristics, material characteristics, and optical characteristics. For example, elastic members having different thicknesses, different elastic moduli, or different light transmissivity may be used.

Description of the liquid to be used in the present exemplary embodiment is similar to the description in the first exemplary embodiment. The three liquids used in the present exemplary embodiment may not necessarily be different from one another.

The feature that the liquid lens of the present exemplary embodiment has the effect of reducing the space as compared to the liquid lens in which the liquid amounts are adjusted is as described in the first exemplary embodiment. Also, the features of the liquid lens of the present exemplary embodiment of having the wider variable curvature range than the liquid lens in which the elastic member does not slide and of enabling a reduction in lens width in the direction orthogonal to the elastic member are as described in the first exemplary embodiment.

Further, since the connection portion to which the elastic member is integrally attached is directly driven via the shaft attached to the ring-like member in the liquid lens of the present exemplary embodiment, highly reliable driving control is enabled. Also, owing to the thread-fitting of the protection member and the connection portion, it is possible to attain the stable movement without stuttering even when the width of the connection portion is reduced and to take a wider sliding range of the connection portion within the protection member.

Figure 18:
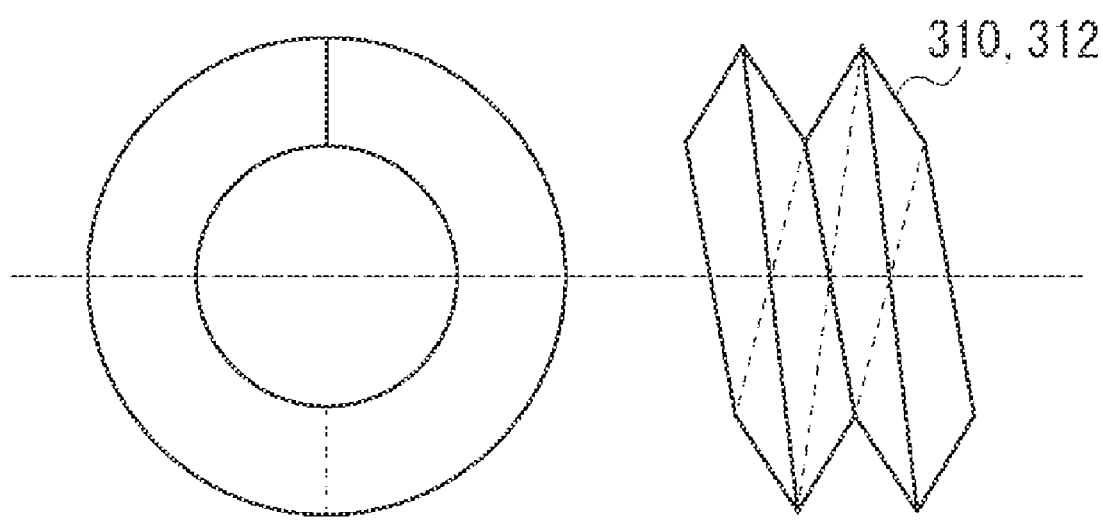
FIG. 18 is a diagram illustrating a plan view and a side view of a sealing member of the liquid lens according to the third exemplary embodiment.
Figure 19:
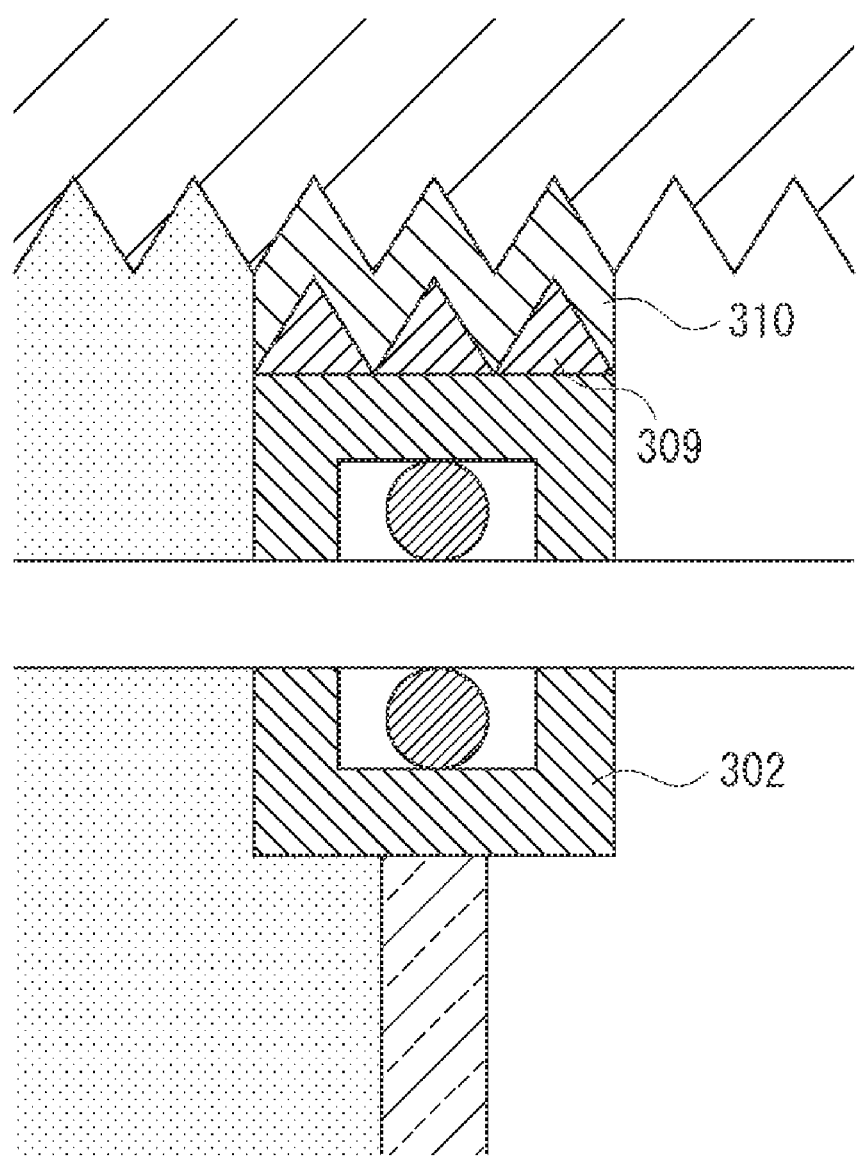
FIG. 19 is a detailed sectional view illustrating a part B of the liquid lens illustrated in FIG. 15.

FIG. 18 is a diagram illustrating a plan view and a side view of the sealing members 310 and 312. FIG. 19 is a detailed sectional view illustrating a part B of the liquid lens illustrated in FIG. 15. As illustrated in FIG. 19, the sealing member 310 is integrally provided in such a manner as to cover a thread portion 309 of the connection portion 302 over a length of at least one pitch. The sealing member 310 is disposed in such a manner as to fill a gap of fitting when the thread portion 309 engages with a thread portion 325 of the protection member 301. Likewise, the sealing member 312 is disposed in such a manner as to fill a gap of fitting when the thread portion 311 engages with a thread portion 326 of the protection member 301. The sealing member 310 is moved integrally with the thread portion 309 when the connection portion 302 slides along the thread portion. Accordingly, the sealing member 310 slides in the longitudinal direction of the protection member 301 along with the connection portion 302. Likewise, the sealing member 312 is moved integrally with the thread portion 311 when the connection portion 303 slides along the thread portion. Accordingly, the sealing member 312 slides in the longitudinal direction of the protection member 301 along with the connection portion 303. As described above, since the sealing member 310 slides along with the connection portion 302 while filling the gap of fitting between the thread portions 309 and 325, it is possible to prevent deterioration of optical characteristics otherwise caused by mixing of the liquids that enter the gap of fitting when the connection portion 302 is caused to slide. Likewise, it is possible for the sealing member 312 to prevent deterioration of optical characteristics otherwise caused by mixing of the liquids that enter the gap of fitting of the thread portions 311 and 326 when the connection portion 303 is caused to slide. The higher a close contact property between the sealing members 310 and 312 and the thread portions 309 and 325 and the thread portions 311 and 326, respectively, the more excellent the effects. Therefore, it is desirable that the sealing members 310 and 312 have appropriate elasticity and a geometric shape that has little gap with the thread portions to be fitted.

For example, it is effective to make the inner diameter of the sealing member 310 smaller than the outer diameter of the thread portion 309 and to make the outer diameter of the sealing member 310 larger than the inner diameter of the thread portion 325. Likewise, it is effective to make the inner diameter of the sealing member 312 smaller than the outer diameter of the thread portion 311 and to make the outer diameter of the sealing member 312 larger than the inner diameter of the thread portion 326.

Figure 20:
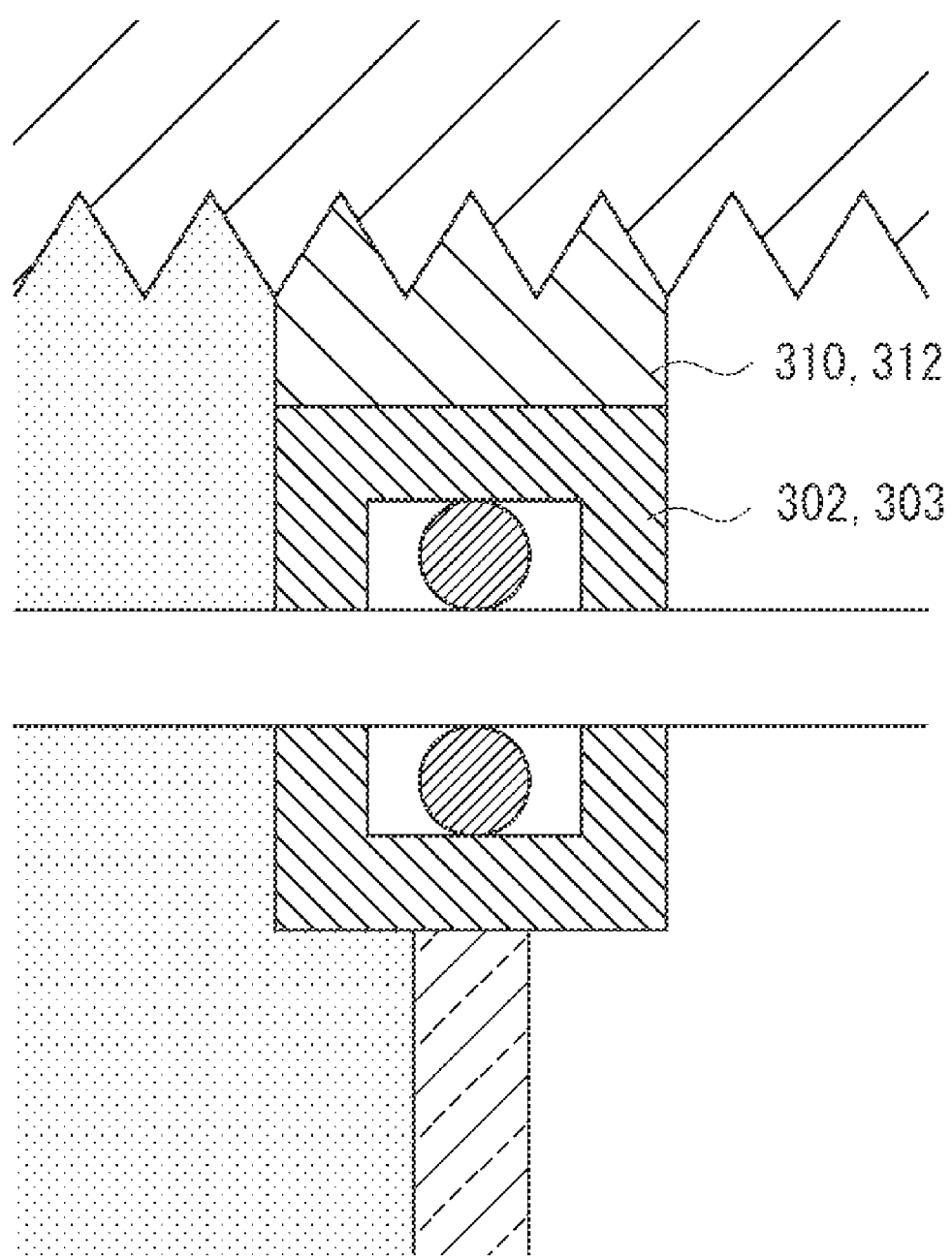
FIG. 20 is a sectional view illustrating another mode of the liquid lens according to the third exemplary embodiment.

FIG. 20 is a partially sectional view illustrating a liquid lens in which the thread portions of the connection portions 302 and 303 are formed of the sealing members 310 and 312. As described above, the sealing members are required to have a certain degree of elasticity due to the requirement of close contact property, but optical position accuracy is maintained since the connection portions 302 and 303 are positioned by the shafts 321 and 322 provided on the ring-like members 314 and 315.

Therefore, it is possible to maintain the optical position accuracy of the connection portions 302 and 303 even when the thread portions of the connection portions 302 and 303 are formed of the sealing members 310 and 312 as illustrated in FIG. 20.

Figure 21:
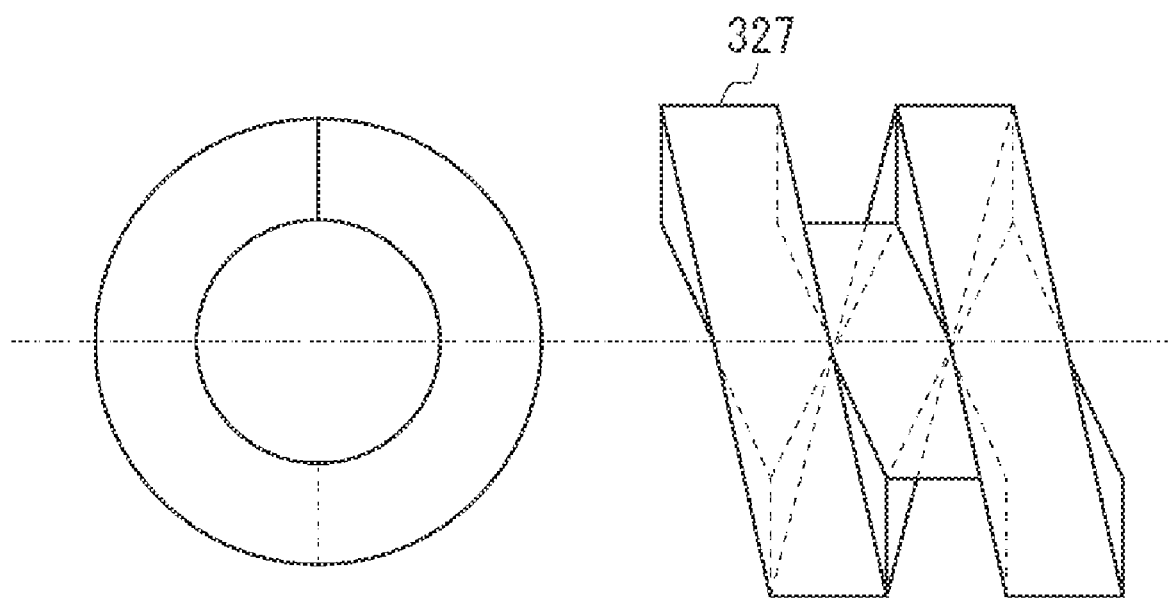
FIG. 21 a diagram illustrating a plan view and a side view of a sealing member of a liquid lens which is yet another mode of the liquid lens according to the third exemplary embodiment.

FIG. 21 is a diagram illustrating a plan view and a side view of a sealing member 327 in the form of a square thread. The sealing member 327 is different from the sealing members 310 and 312 for the triangular thread illustrated in FIG. 18 by the feature that roots of the thread are connected, but a usage thereof is similar to the triangular thread.

Figure 22:
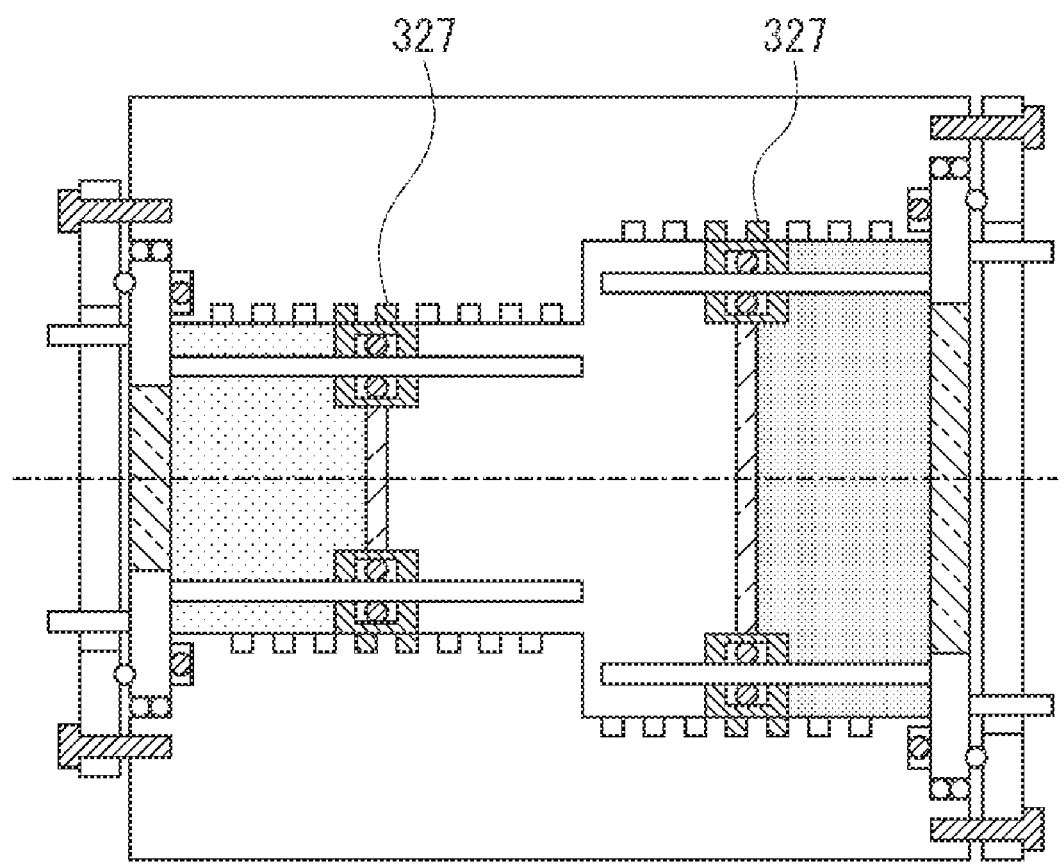
FIG. 22 is a sectional view illustrating yet another mode of the liquid lens according to the third exemplary embodiment.

FIG. 22 is a sectional view illustrating a liquid lens in which the thread portions 309, 311, 325, and 326 of the liquid lens illustrated in FIG. 13 are formed of square threads, and the sealing member 327 for square thread illustrated in FIG. 21 is used for each of the sealing members 310 and 312. The sealing member for square thread enables to prevent deterioration of optical characteristics otherwise caused by the liquid entered into a gap of fitting between the thread portion of the protection member and the thread portion of the connection portion as in the sealing members for triangular thread. Also, the geometric shape that the sealing member for square thread is required to have is similar to that required for the sealing member for triangular thread. Further, it is possible to apply the description of the triangular thread to the capability of maintaining optical position accuracy of the connection portion when the thread portion of the connection portion is formed of the sealing member for square thread.

FIGS. 23A and 23B and FIGS. 24A and 24B are sectional views illustrating an effect of changing diameters of the elastic members in a liquid lens having two elastic members for separating three liquids.

For brevity of description, only a protection member 330, sealing members 331 and 332, liquids 333, 334, and 335, and transparent portions 336 and 337 are illustrated.

Figure 23A:
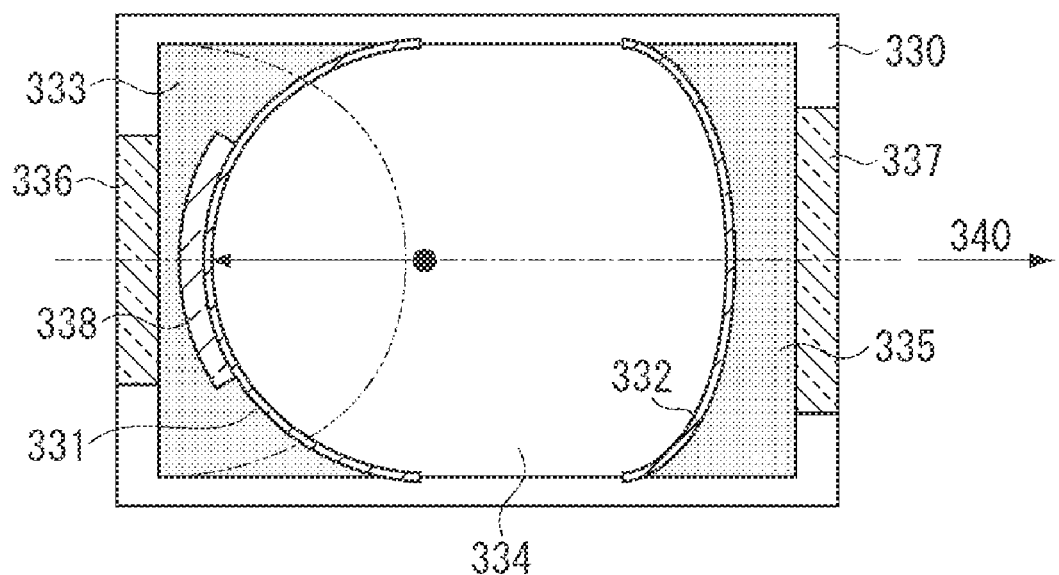
FIGS. 23A and 23B are diagrams illustrating an effect of the third exemplary embodiment.
Figure 23B:
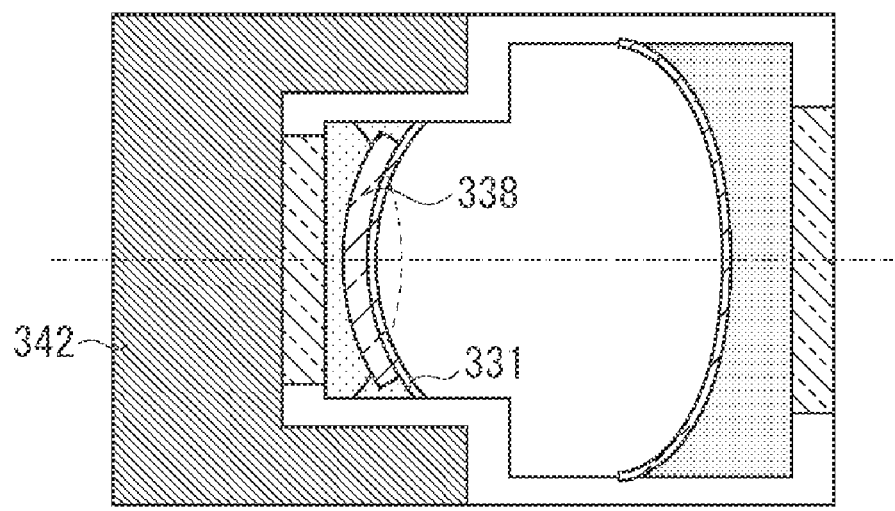

FIGS. 23A and 23B are sectional views illustrating the liquid lens in a state where a variable curvature range of the elastic member 331 is maintained and the lens is downsized in a radial direction and a longitudinal direction 340 of the cylindrical protection member 330.

When a light beam effective portion of a curved lens surface formed by the elastic member 331 is a range 338, it is possible to downsize the liquid lens within a range of not blocking the light beam effective portion 338 in the radial direction of the protection member 330. In the case of using a curved lens surface within the same variable curvature range in the elastic member 331, a smaller movement amount of the elastic member is attained by a smaller diameter as illustrated in FIGS. 23A and 23B. As described above, it is possible to downsize an outer shape of the protection member and to reduce a width of the protection member as indicated by a shaded part 342 in FIG. 23B by determining a diameter of the elastic member according to the light beam effective portion of the optical system.

Figure 24A:
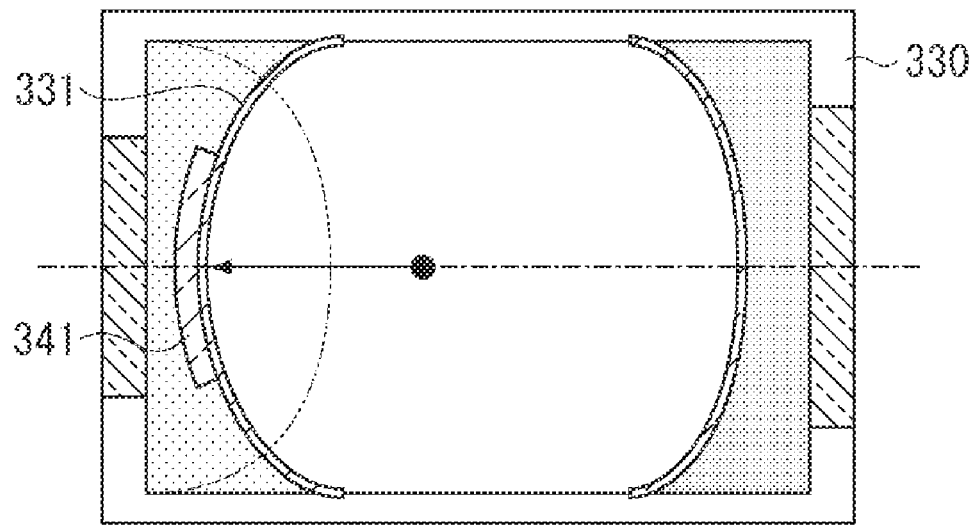
FIGS. 24A and 24B are diagrams illustrating an effect of the third exemplary embodiment.
Figure 24B:
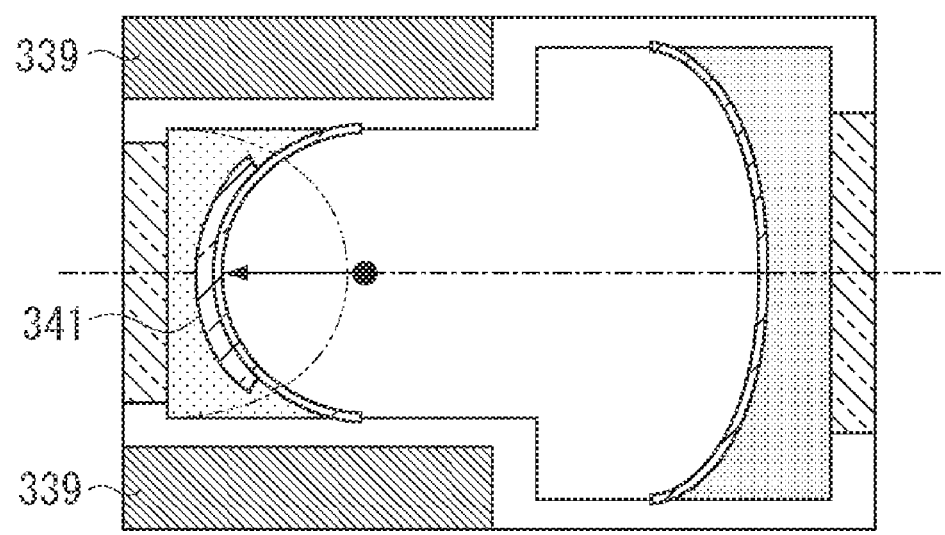

FIGS. 24A and 24B are sectional views illustrating a liquid lens in a state where the variable curvature range of the elastic member 331 is increased by downsizing the lens only in the radial direction of the protection member 330 without changing the lens width in the longitudinal direction 340 of the protection member 330.

As described with reference to FIGS. 23A and 23B, when a light beam effective portion of a curved lens surface formed of the elastic member 331 is a range 341, it is possible to reduce the diameter of the elastic member 331 within a range of not blocking the light beam effective portion 341. When a movement amount of the elastic member 331 is unchanged, it is possible to increase the curvature as illustrated in FIG. 24B as compared to that illustrated in FIG. 24A, in which the diameter of the elastic member 331 is larger. In other words, it is possible to increase the variable curvature range of the elastic member 331. In this case, the space 339 is reduced as is apparent from FIG. 24B.

The above-describe effect is attained in a liquid lens formed of three or more liquids, having two or more elastic members for separating the liquids from one another, and a light beam effective portion of at least one of the elastic members is different from that of another of the elastic members by reducing the diameter of the elastic member having the relatively small light beam effective portion.

Also, though the protection member has the cylindrical shape in the above-described exemplary embodiments, the liquid lens may be formed by using a square protection member. In this case, quadrangle transparent portions are provided in the liquid lens, and a quadrangle elastic member is provided inside the liquid lens. Also, though the connection portion described above has the ring-like shape, the liquid lens is provided with a connection portion which is in the form of a quadrangular frame for holding the elastic member and slidable along an inner wall of the protection member. Though the circular and quadrangular elastic members are given as the examples in the first to the third exemplary embodiments, it is possible to use an elastic member having a D-cut shape in which a part of the circular shape is linearly cut off. Such an elastic member can also attain the effect described with reference to FIGS. 23A and 23B and FIGS. 24A and 24B.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288828 filed Dec. 21, 2009, which is hereby incorporated by reference herein in its entirety.

What is claimed is:

1. A liquid lens including at least two phase liquids covered with a protection member having transparent portions allowing transmission of light, the liquid lens comprising:
   an elastic film configured to separate the at least two phase liquids within the protection member, and consist of a material unlike the at least two phase liquids;
   a connection portion configured to connect the protection member to the elastic film; and
   a movement unit configured to move the connection portion within the protection member.

2. The liquid lens according to claim 1, wherein the connection portion is connected to an edge portion of the elastic film, and wherein the elastic film has a higher elastic modulus at the edge portion than at a central portion thereof.

3. The liquid lens according to claim 1, wherein the connection portion includes a member having water repellency.

4. The liquid lens according to claim 1, wherein the protection member and the connection portion are fitted to each other by a thread portion, and wherein the liquid lens further comprises a sealing member capable of sliding with respect to the protection member and covering a gap of the thread portion.

5. The liquid lens according to claim 1, wherein the elastic film includes a plurality of elastic members having respective different outer diameters.

6. The liquid lens according to claim 5, wherein a shape of an inner diameter of the protection member varies depending on the different outer diameters of the plurality of elastic members.

7. The liquid lens according to claim 1, wherein the transparent portions form surfaces that are perpendicular to a direction of light incident on the liquid lens.

8. The liquid lens according to claim 5, wherein the at least two phase liquids include at least three phase liquids that are separated by the plurality of elastic members.

* * * * *